United States Patent [19]
Seitz et al.

[11] Patent Number: 5,680,055
[45] Date of Patent: Oct. 21, 1997

[54] METHOD AND APPARATUS TO SENSE CHANGES IN THE STATE OF A RESIN BED

[75] Inventors: Martin A. Seitz, Brookfield; Charles J. Koehler; Richard W. Hirthe, both of Milwaukee; Patrick J. Dupies, Whitefish Bay; Don D. Vaughan, Brookfield, all of Wis.

[73] Assignee: Marquette University, Milwaukee, Wis.

[21] Appl. No.: 504,140

[22] Filed: Jul. 19, 1995

[51] Int. Cl.$^6$ .......................... B29C 35/62; G01R 27/08
[52] U.S. Cl. .................. 324/715; 264/40.2; 324/713
[58] Field of Search .................. 324/715, 713, 324/690, 663; 156/64; 422/62; 264/40.2

[56] References Cited

U.S. PATENT DOCUMENTS

| | | | |
|---|---|---|---|
| 3,383,863 | 5/1968 | Berry | 324/713 |
| 3,601,693 | 8/1971 | Lorentzen | 324/715 |
| 3,791,792 | 2/1974 | Lindsay | 73/15 R |
| 4,158,628 | 6/1979 | Fleckenstein . | |
| 4,299,698 | 11/1981 | Rak et al. . | |
| 4,320,010 | 3/1982 | Tucci et al. . | |
| 4,359,687 | 11/1982 | Vinegar et al. | 324/366 |
| 4,399,100 | 8/1983 | Zsolnay et al. | 364/500 |
| 4,423,371 | 12/1983 | Senturia et al. | 324/61 R |
| 4,777,431 | 10/1988 | Day et al. | 324/690 |
| 4,814,090 | 3/1989 | Kunz et al. . | |
| 4,847,598 | 7/1989 | Tucci et al. . | |
| 4,917,794 | 4/1990 | Fettes et al. . | |
| 5,128,652 | 7/1992 | Slocum . | |
| 5,210,499 | 5/1993 | Walsh | 324/649 |
| 5,219,498 | 6/1993 | Keller et al. | 324/663 |
| 5,234,601 | 8/1993 | Janke et al. . | |
| 5,266,899 | 11/1993 | Bull et al. | 324/439 |
| 5,486,768 | 1/1996 | Silvus, Jr. et al. | 324/715 |
| 5,528,155 | 6/1996 | King et al. | 324/713 |

FOREIGN PATENT DOCUMENTS

| | | | |
|---|---|---|---|
| 0285093 | 10/1988 | European Pat. Off. | 324/715 |
| 2580801 | 10/1986 | France . | |
| 0069062 | 5/1980 | Japan | 324/715 |
| 0172540 | 10/1983 | Japan | 324/715 |

Primary Examiner—Maura K. Regan
Attorney, Agent, or Firm—Lee, Mann, Smith, McWilliams, Sweeney & Ohlson

[57] ABSTRACT

A system to sense changes in the state of an ion exchange resin bed which includes first and second current electrodes spaced from each other, a first electrical circuit electrically connecting the current electrodes and designed to be connected to a source of alternating current, and also including first and second voltage probes spaced from each other and located approximately between said first and second current electrodes with a wire connecting voltage probes. A second electrical circuit consists of the first and second voltage probes, the wire and the portion of the resin bed lying between said voltage probes so that when the first electrical circuit is energized by the source of alternating current a voltage is induced in the second electrical circuit which corresponds to the state of the resin bed located between the first and second voltage probes.

14 Claims, 8 Drawing Sheets

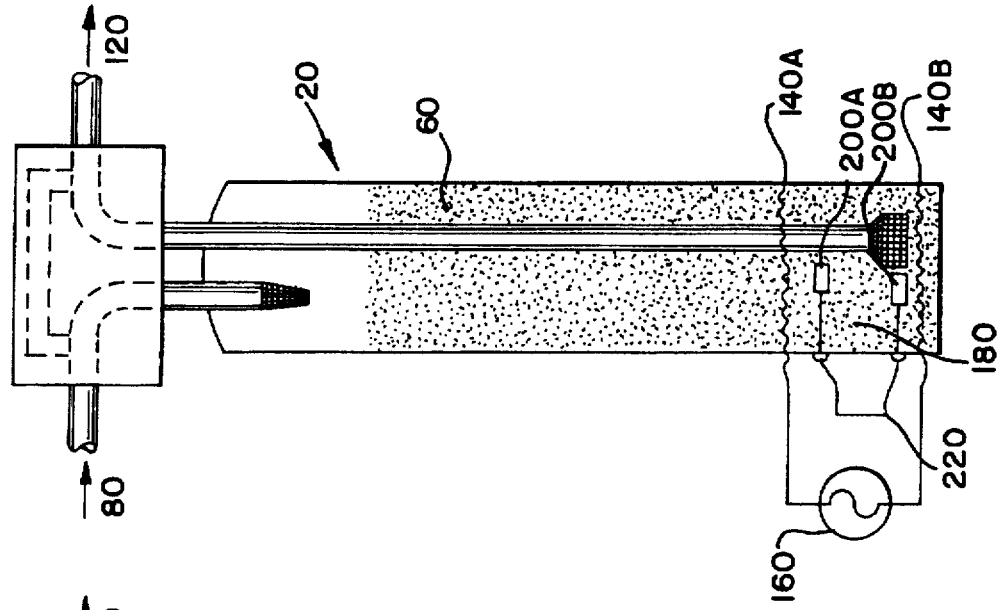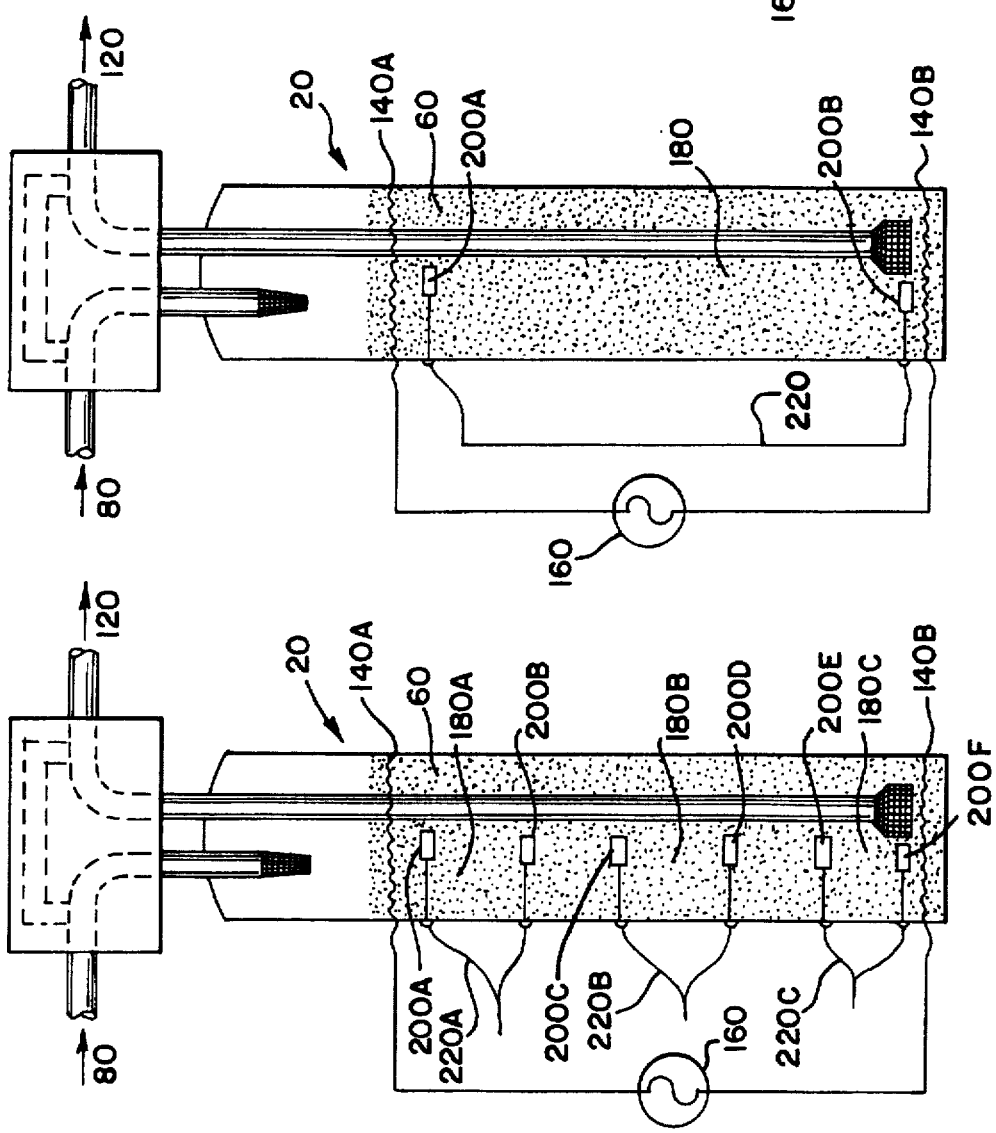

FIG.13 FUNCTIONAL BLOCK DIAGRAM FOUR PROBE SENSOR ELECTRONICS

METHOD AND APPARATUS TO SENSE CHANGES IN THE STATE OF A RESIN BED

BACKGROUND OF THE INVENTION

1. Field of the Invention

This invention relates generally to ion exchange equipment designed to remove ions from fluid, and more specifically to a new and improved apparatus and method for indicating the need for regeneration of the ion exchange resin bed.

2. Discussion of the Prior Art

Ion exchange resin removes undesirable ions from a fluid and replaces them with different ions. The most common example of this is the sodium zeolite ion exchange resin bed typically utilized in most water softening systems. Calcium and magnesium ions are removed from the fluid, usually water, and replaced with sodium ions. This improves the "softness" of the water, which feeds into a distribution system.

The need for proper regeneration of ion exchange resin beds has been around as long as the resin beds have been around. If the user regenerates a bed too soon, the user wastes regenerant, usually a brine solution. Different beds use different regenerants. For example, a sodium zeolite bed is regenerated with rock salt solution, but other beds may be regenerated with concentrated acids or with sodium hydroxide. These regenerants may be expensive, thus eliminating waste is important and environmentally friendly.

If the user regenerates the bed too late, the user may experience leakage of the undesirable ions from the ion exchange unit. Depending upon the application, this may have severe consequences, such as hardness leakage into boilers or contamination of treated waste water. If the application is critical, the user must have a reliable method of determining the state of the resin bed.

A common, expensive method for determining the state of the bed is manual testing. Here, the user draws a sample of fluid from the outlet of the ion exchange unit, and runs a chemical test for the undesirable ion. In the event that the test is positive, the user regenerates the unit. If the unit tests negative, it continues to run. This method is time consuming and expensive because of the man hours and chemical reagents required to implement it.

Another common method of regenerating resin beds which eliminates the need for testing, is the use of flow meters. The capacity of resin beds is well known in the art, and manufacturers publish tables showing the capacity versus the amount of regenerant utilized. Based on the knowledge of the concentration of undesirable ions in the inlet fluid, the volume of fluid from the flow meter and the capacity of the resin bed, the volume of fluid to be safely treated can be estimated. This method has drawbacks as well. For example, if the concentration of undesirable ions increases in the inlet fluid, leakage may occur. If problems with the resin bed or associated equipment occur (such as channeling, broken distributors, or improper regeneration), leakage will also occur. If problems with the resin occur (such as fouling, breakdown, or loss of resin from improper backwashing), leakage will occur. For these reasons, flow meters are an unacceptable method of determining when to regenerate the resin bed.

A third common method involves the use of timers to determine when to regenerate the resin bed. An empirical approach is taken to determine how long the resin bed lasts until regeneration is required. This method is unacceptable because increases in fluid use or increases in the concentration of undesirable ions will cause leakage to occur. Also, mechanical and/or chemical problems may also cause leakage to occur. For these reasons, timers are unacceptable for determining when to regenerate the resin bed.

Electronic devices exist in the prior art to aid in the determination of the state of the resin bed. Such devices have been disclosed in U.S. Pat. No. 4,814,090 (electrical conductivity of resin used to determine when to regenerate), U.S. Pat. No. 5,234,601 (electrical conductivity of resin used to determine when to regenerate), U.S. Pat. No. 4,320,010 (use of electrical probes to measure the change in electrical potential through the resin bed as the hardness front moves through the resin bed), and U.S. Pat. No. 4,814,090 (electrical conductivity measured in horizontal plane to eliminate interferences).

These devices all have drawbacks. First, many factors affect the impedance or resistance of the resin bed as measured by the probes. These prior art systems all use a probe which both provides electrical current and simultaneously measures the impedance or resistance of the resin. This dual use creates interferences that dramatically affect the ability of the probe to properly measure the state of the resin bed. Second, the probes, if not constructed of an inert material such as platinum or graphite, will foul and add additional interferences. Third, changes in the incoming water temperature and/or water chemistry affect the conductivity of the water a great deal.

Prior art measuring devices have recognized such interferences and sought ways to avoid them. For example, U.S. Pat. No. 4,299,698 recognizes that inappropriate, frequent regenerations may occur, and thus couples the signal from the electronic probes with a timer, and only regenerates when both the timer and the probes indicate that regeneration should occur. While this method may prevent unnecessary regenerations, it does not prevent the unit from leaking unwanted ions. It further will have trouble dealing with mechanical or chemical problems within the resin bed unit.

The present invention provides an accurate measurement of the state of the resin bed located between the voltage probes.

SUMMARY OF THE INVENTION

The present invention measures the impedance between two voltage probes placed within the resin bed. The two voltage probes are placed between two current electrodes. These outer current electrodes act as a source of bilateral constant alternating current, generated with a precision sine wave generator. The current electrodes are preferably annular rings, with a wire mesh filling the interior of the annulus. The shape of the current electrodes creates a strong electrical field to eliminate outside electrical interferences and to induce a stronger voltage between voltage probes. The voltage probes are preferably coated with an inert material such as platinum or graphite to prevent fouling.

The two current electrode two voltage probe arrangement eliminates interferences created in the prior art systems that arise from the dual use of an element acting both as an current electrode and a voltage probe at the same time. As the fluid in the resin bed, present at the interstices of the resin beads, is an ionic conductor, current flow through the bed and into an external electronic measurement circuit requires that a charge transfer reaction be operative at the surface of both electrodes. Such a reaction typically exhibits an additional component of impedance that is dominant at lower AC frequencies. In a two voltage probe measurement conducted at low frequencies, the impedance derived from this electrode reaction obscures and masks the impedance changes occurring in the resin bed. Thus, the electrical characteristics of the bulk of the resin bed can be directly observed, independent of any interfering electrode impedance, using spacially separated voltage probes and current electrode pairs.

The present invention also uses frequency discrimination to determine the optimum frequency which yields a large differential signal that corresponds to the change in state of the resin bed (in a sodium zeolite bed, this change would be from the sodium enriched state to the calcium/magnesium enriched state). Frequency discrimination is applied by using a non-linear mathematical model to approximate the various physical phenomena that occur within the resin bed. Based on the data that is input into the mathematical model, non-linear regression analysis can be used to determine the optimum frequency which yields the highest differential signal. This signal, with minimal interference, best approximates what the actual state of the resin bed is.

Thus, the combination of the two current electrode/two voltage probe structure with the frequency optimization provides a sensor which can accurately predict the state of the resin between the two voltage probes within the resin bed.

Those skilled in the art can appreciate that by placing the two voltage probes at various locations within the bed, that different readings of the resin bed can be achieved as the ion wavefront moves through the resin bed. Thus, depending on where the two voltage probes are placed within the bed, different readings will be achieved which provides information for only the state of the resin bed between the voltage probes. Multiple pairs of voltage probes can provide multiple pictures of the state of resin at various points in the bed, as long as the voltage probes are placed within the electrical field created by the two current electrodes.

BRIEF DESCRIPTION OF THE DRAWINGS

FIG. 4 is a second embodiment of the invention.

FIG. 5 is a third embodiment of the invention.

FIG. 6 is a fourth embodiment of the invention.

DETAILED DESCRIPTION OF THE DRAWINGS

Figure 1:
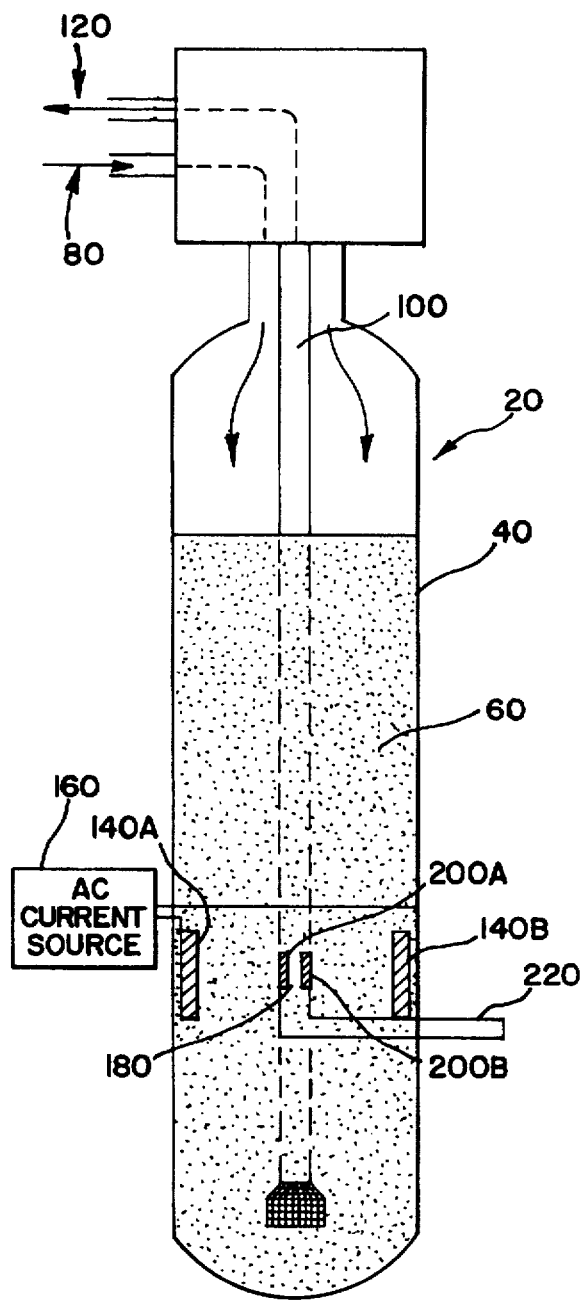
FIG. 1 is a side view of one embodiment of the invention.

FIG. 1 illustrates a first embodiment of the invention. Ion exchange unit 20 is composed of tank 40 containing an ion-exchange resin 60. Untreated fluid enters via inlet 80 and flows down through the resin bed 60, where ion exchange occurs. Treated fluid flows upwardly through standpipe 100 and out the outlet 120 to the faucets and other fluid dispensing units located in the facility.

In this embodiment, a pair of current electrodes 140A and 140B is connected to an AC current source 160. The current electrodes 140A and 140B are preferrably made from an inert material such as graphite or platinum to prevent current electrode corrosion. When the current is running, an electric field is generated between the two current electrodes, which induces a voltage in circuit 180. Circuit 180 is comprised of a pair of voltage probes 200A and 200B, a connecting wire 220 and the resin between the two voltage probes 200A and 200B completing the circuit 180. The resin between the two voltage probes 200A and 200B acts as a resistor. The change in the voltage in the circuit 180 over time corresponds to the change in the state of the resin over time.

Figure 2:
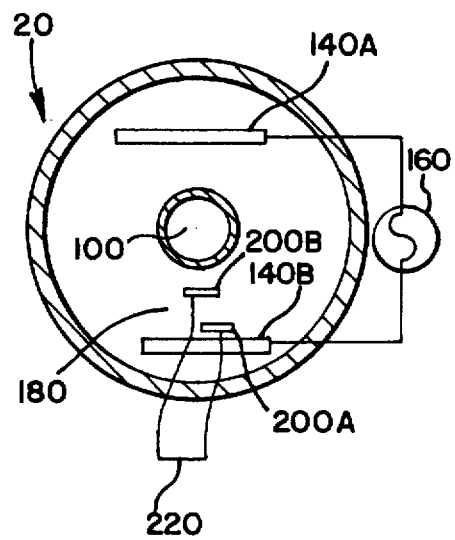
FIG. 2 is a top view of the embodiment shown in FIG. 1.
Figure 3:
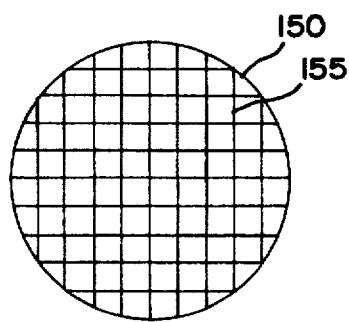
FIG. 3 is a top view of a current electrode.

FIG. 2 is an overhead view of the embodiment shown in FIG. 1. FIG. 3 is an overhead view of a single current electrode 140A. In the preferred embodiment of the current electrode 140A, it has an annular ring 150 on the outside, filled with a wire mesh 155 on the inside. The wire mesh 155 provides a uniform electric field, which creates a better induced voltage in the electrical circuit 180. A stronger electrical field is also important to help prevent interferences from stray electrical fields that may interfere with the operation of the invention.

FIG. 4 is another embodiment of the current invention. FIG. 4 shows three different electrical circuits 180A, 180B and 180C within the resin bed 60 and vertically spaced voltage probes 200A, 200B, 200C, 200D, 200E and 200F connected by wires 220A, 220B and 220C respectively. Each electrical circuit 180A, 180B and 180C measures the impedance of a different portion of the resin bed 60. Thus, the ion wave front can be tracked as the ions are exchanged in the unit. The electrical circuit 180A would first indicate an exhaustion of resin at the top of the resin bed 60 between voltage probes 200A and 200B, followed by the second electrical circuit 180B, followed by the last electrical circuit 180C. The additional circuits 180B and 180C provide more information on what is actually occurring within the resin bed, and may help diagnose mechanical problems such as channeling or broken distributors. This is especially true if the voltage probes 200A-200F are oriented asymmetrically in the resin bed 60.

FIG. 5 shows another embodiment of the invention with the two voltage probes 200A and 200B placed at the very top and very bottom of the resin bed 60 between current electrodes 140A and 140B. In this orientation, the resistance of the entire resin bed 60 is part of the circuit 180. The user of this system would notice a slow, continuous gradual change in the voltage of the electrical circuit 180 over time.

FIG. 6 shows yet another embodiment of the invention with the two voltage probes 200A and 200B placed at the very bottom of the resin bed 60. In this orientation, the user would experience virtually no change in the voltage of the circuit 180 until the unit is almost exhausted, at which point a steep change in the voltage of the circuit 180 would occur.

Figure 7:
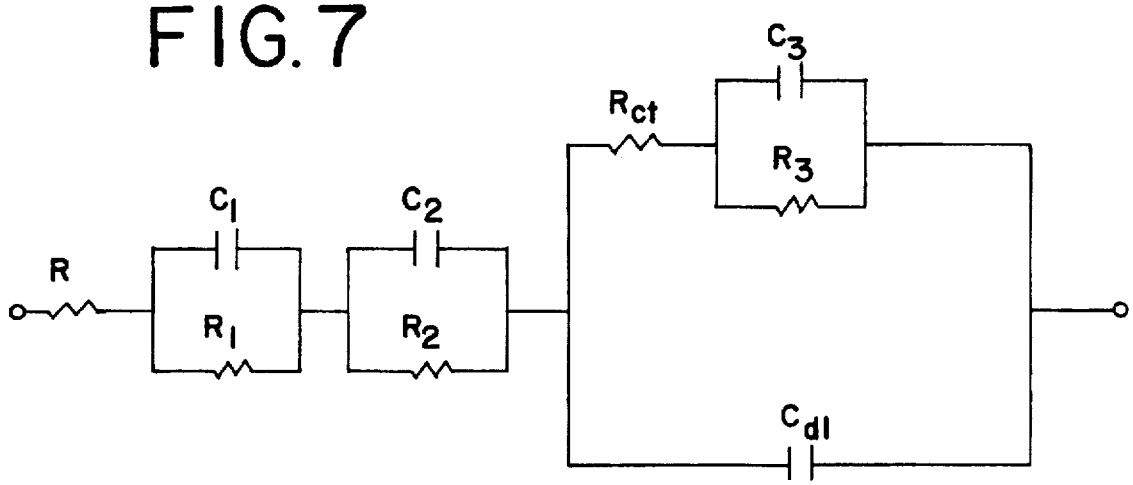
FIG. 7 is a non-linear representation through a circuit diagram of the factors that affect the impedance of the resin.

FIG. 7 shows an electrical circuit which represents a mathematical model for the physical phenomena that occur within a resin bed when fluidized. The symbol R represents the impedance of the water, and is relatively constant at a given location except for slight variations due to temperature. The symbols $R_1$ and $C_1$ represent changes in the geometry of the bed and the effect these changes would have on the impedance. Symbols $R_2$ and $C_2$ represent material changes in the impedance of the resin as the resin bed changes from the enriched to the depleted state. $R_3$ and $C_3$ represent a diffusion coefficient and the rate of transfer of ions in and out of the resin beads themselves. $R_{ct}$ represents the charge transfer impedance present in the resin beads. $C_{dl}$ represents the atmosphere, to the extent it exists, around the resin beads and the effect it has on the impedance. Not shown in FIG. 7 but possibly applicable would be $R_4$ and $C_4$, which would represent the adsorption onto the surface of the resin bead by the particular ions and the effect such adsorption has on the impedance. The net effect of the variables is that with enough empirical data, those skilled in the art of mathematical modeling can do a non-linear least squares mathematical model to solve for each of the variables. The variables represent interferences with the main variable, $R_2$, which reflects the material change from the enriched to the depleted state. Thus, by measuring the impedance between the voltage probes, and subtracting out known, constant interferences, a highly sensitive measurement of the state of the resin can be obtained. This method of modeling and determination of known, constant interferences represents a breakthrough previously unknown in the prior art.

Figure 8:
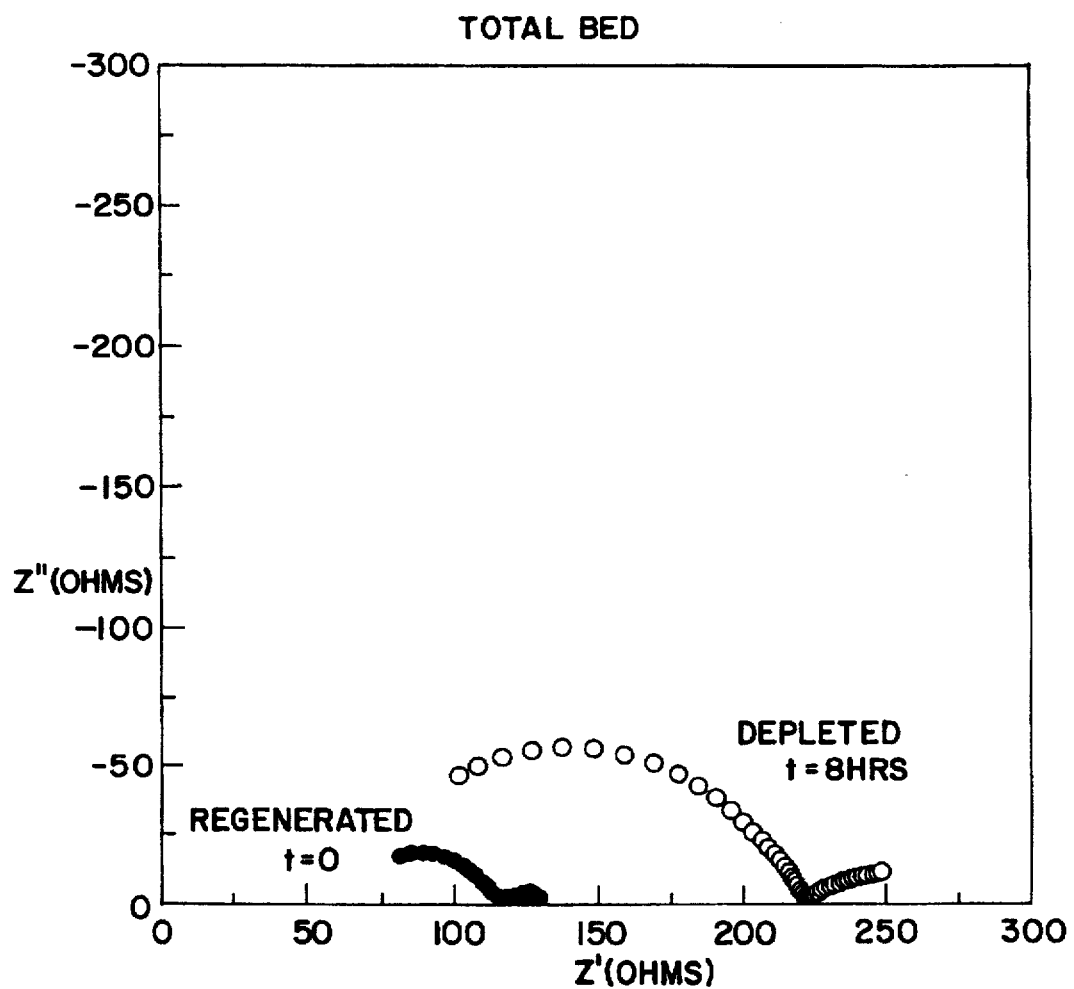
FIG. 8 is a graph showing the effects of different frequencies on various parameters, both at time equals zero and time equals infinity (eight hours).

FIG. 8 represents a graphical portrayal of some empirical test data. Each circle represents values from a particular frequency. For this particular test run, the impedance of the whole bed was measured, utilizing the voltage probe configuration of FIG. 5. Z', the value along the X-axis, represents the sum of $R_1$ and $R_2$. In the graph of FIG. 8, by choosing the right frequency, other interferences are automatically eliminated from the response. This frequency is shown by the spot where the Z" value is the lowest and then starts to climb. From an empirical point of view, this frequency ranges from about one kilohertz to about one hundred kilohertz, with ten kilohertz being preferred. Thus, most interferences are minimized simply by choosing the proper frequency to determine the impedance.

Figure 9:
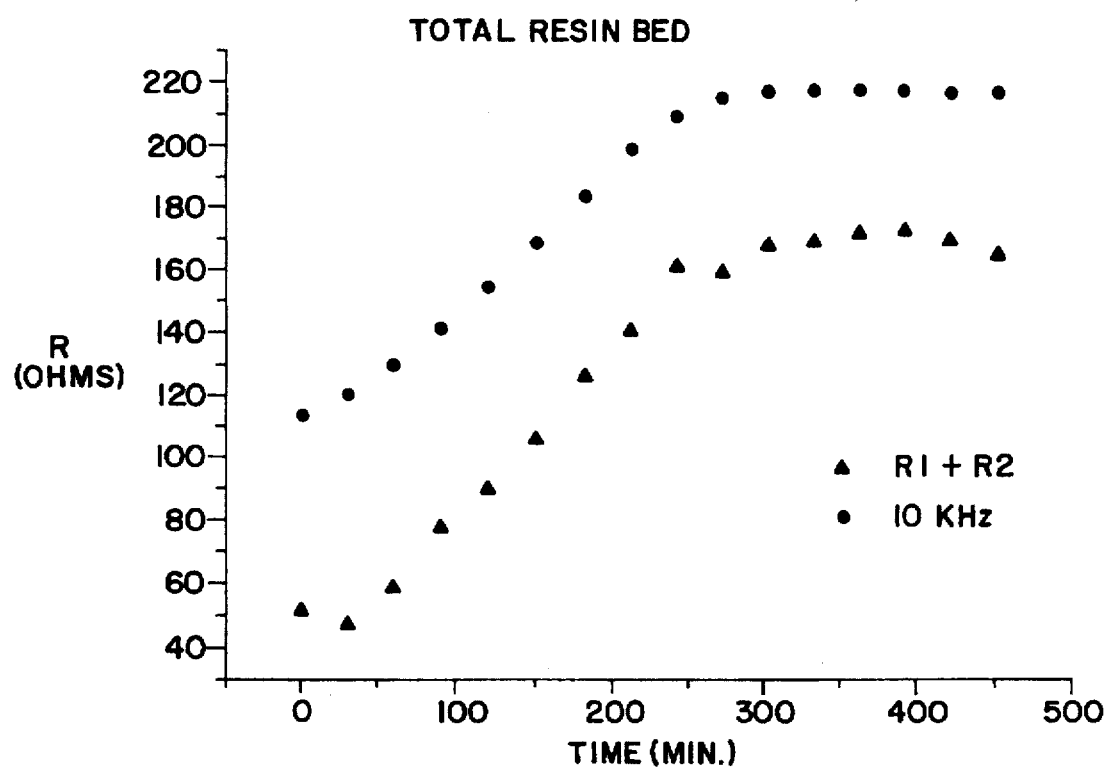
FIG. 9 is a graph showing how the sensitivity of the current invention is boosted by subtracting out known, constant interferences.

FIG. 9 shows the sensitivity to the state of the resin bed obtained by measuring the impedance of the resin at ten kilohertz. The value of the impedance measured at ten kilohertz is plotted with the circles. To determine $R_1$ and $R_2$, one simply subtracts out the known constant value of R. This value is approximated by the vertical differences between the circles and the triangles in FIG. 9.

Figure 10:
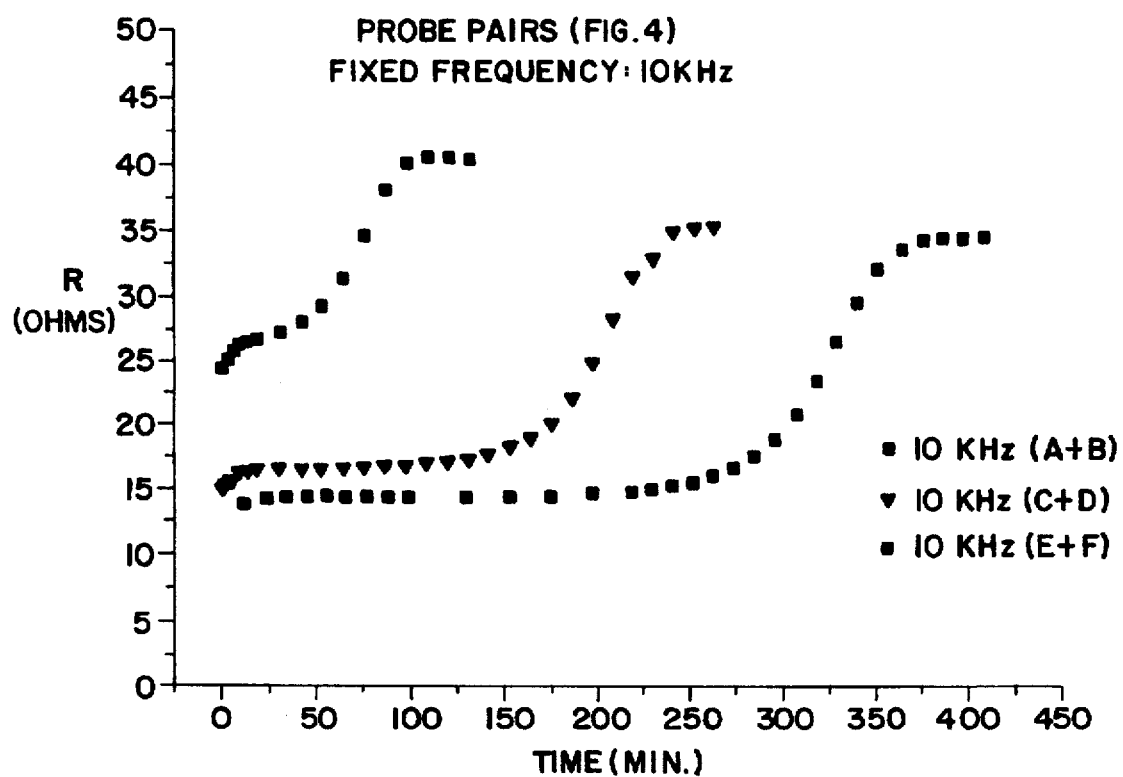
FIG. 10 is a graph plotting the results from the sensors of the embodiment shown in FIG. 4.

FIG. 10 shows how the voltage probe pairs function at a fixed frequency of ten kilohertz. FIG. 10 is the graphical representation of actual data taken from the voltage probe configuration shown in FIG. 4. Voltage probes 200A and 200B, placed highest in the bed, quickly show the change from the enriched to the depleted state. Voltage probes 200C and 200D, placed in the middle of the bed, take longer to show the depletion. Finally, voltage probes 200E and 200F, placed at the bottom of the bed, take the longest amount of time. This bed should properly be regenerated around the three hundred twenty-five minute mark as shown on FIG. 10.

Figure 11:
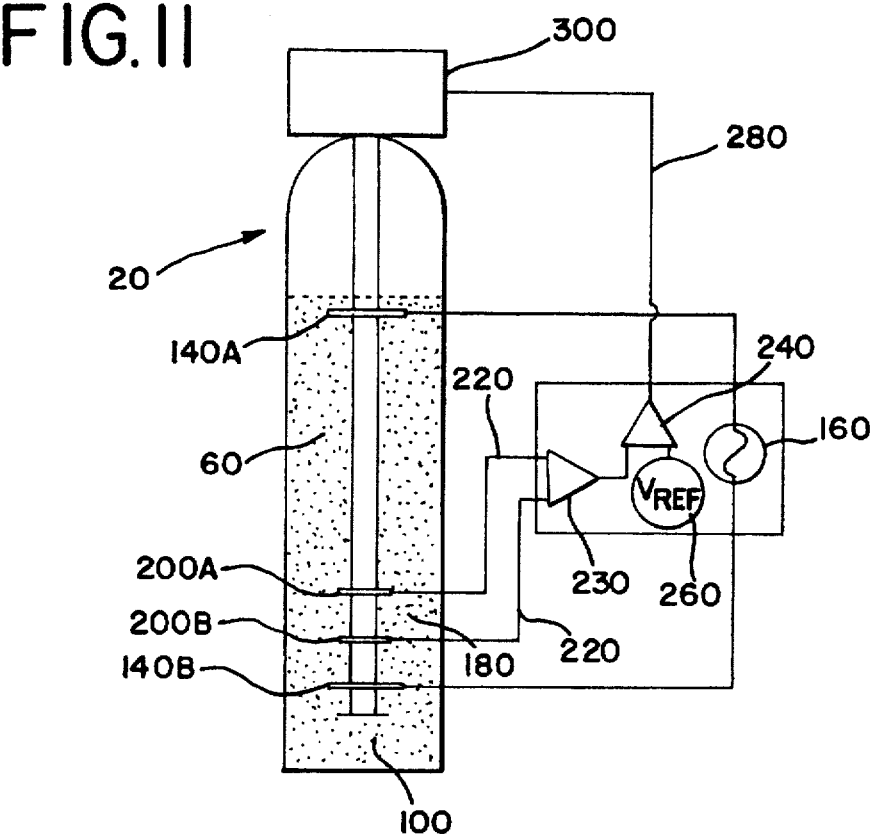
FIG. 11 is a two current electrode/two voltage probe embodiment hooked up to automatically regenerate a softener based on a reference voltage.

FIG. 11 depicts one practical application of the sensor arrangement. The pair of voltage probes 200A and 200B are placed at the bottom of the bed but between the current electrodes 140A and 140B. The voltage probes 200A and 200B are connected to a tuned amplifier 230 by a wire. Although a wire is shown as means to electrically connect the circuit and transfer the voltage value, any other means to carry the voltage signal would be appropriate. The tuned amplifier boosts the amperage of the voltage signal from the electrical circuit. This boosting is required, as the amperage induced by the electrical field is very low. The amplified voltage is then sent to a comparator 240, which compares the boosted voltage to a reference voltage 260. When the boosted voltage exceeds the reference voltage, a signal is sent along wire 280 to the control valve 300, which initiates regeneration of the resin bed in a known manner.

Figure 12:
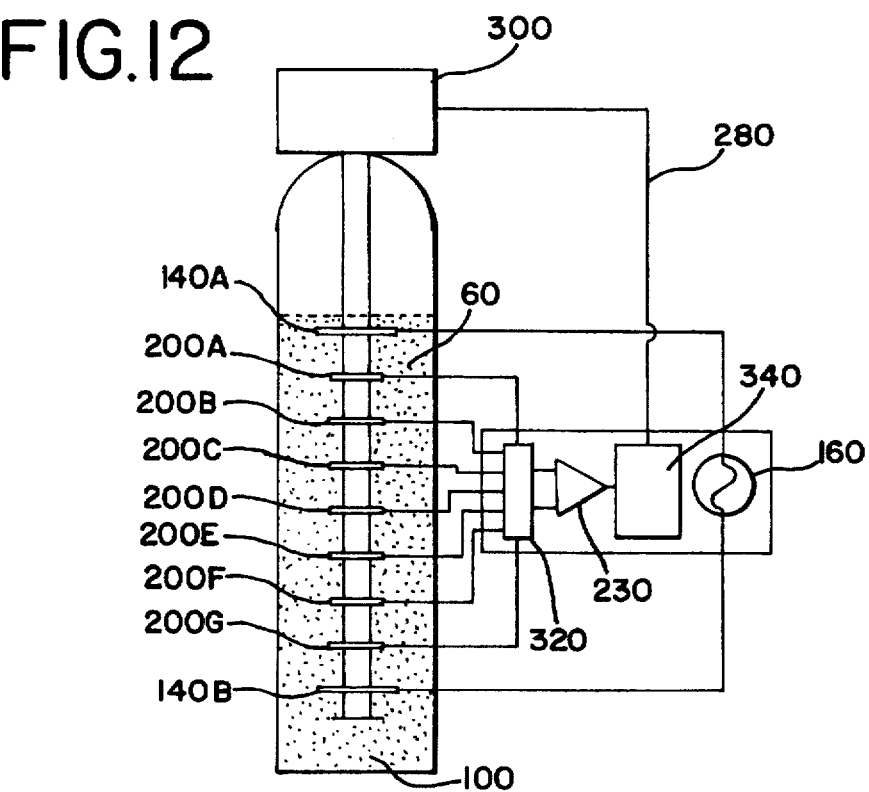
FIG. 12 is a two current electrode/seven voltage probe embodiment hooked up to a multiplexer and computer chip to provide multiple pictures of various portions of the resin.

FIG. 12 shows a more complex system. Here, a series of voltage probes 200A–G are placed throughout the resin bed 60 vertically spaced from each other. Each voltage probe is electrically connected to a multiplexer 320 and can be combined with a different voltage probe 200A–G to create an electrical circuit. Thus, many different slices of resin can be analyzed for the impedance to determine the state of the whole resin bed 60. This information is boosted by the tuned amplifier 230 and sent to a microprocessor 340, which sends a signal along wire 280 to the control valve 300 when it is time to regenerate the resin bed. The advantage of the voltage probe arrangement shown in FIG. 12 is that with the proper programming of the microprocessor 340, conditions such as channeling, resin fouling and broken distributors can be detected and analyzed from the data received. Those skilled in the art will appreciate the amount of time saved by elimination of mechanical trouble-shooting required to diagnose such failures.

Figure 13:
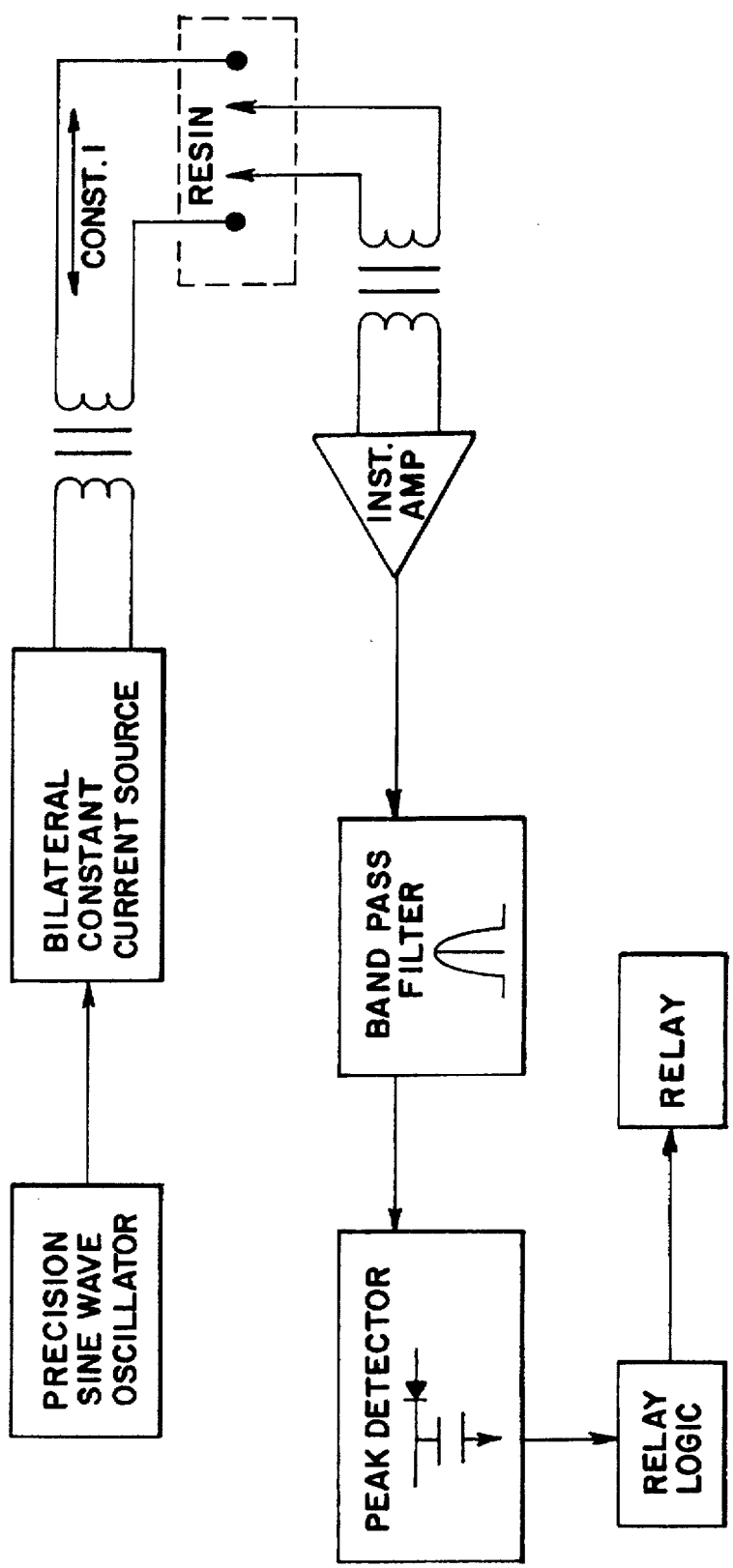
FIG. 13 is a block diagram of the electronics of the embodiment as shown in FIG. 11.

FIG. 13 is a block diagram of the electronics necessary to make the configuration shown in FIG. 11 work properly. A precision sine wave oscillator 360 sends a sine wave at ten kilohertz to a bilateral constant current source 160. This current is sent to a transformer 370 which sends a ten kilohertz AC current to the current electrodes 140A and 140B. A voltage is induced in the voltage probes 200A and B which are connected creating the circuit 180. The impedance of the resin 60 is directly related to the voltage of the circuit 180. A tuned amplifier 230 boosts the signal and sends it to a band pass filter 380, which filters out any noise from stray electrical signals at the wrong frequencies. The signal is then sent to the peak detector 400, which measures the voltages only at the peaks of the wave. The only meaningful information is generated by the peaks of the voltage wave generated from the AC current.

Figure 14:
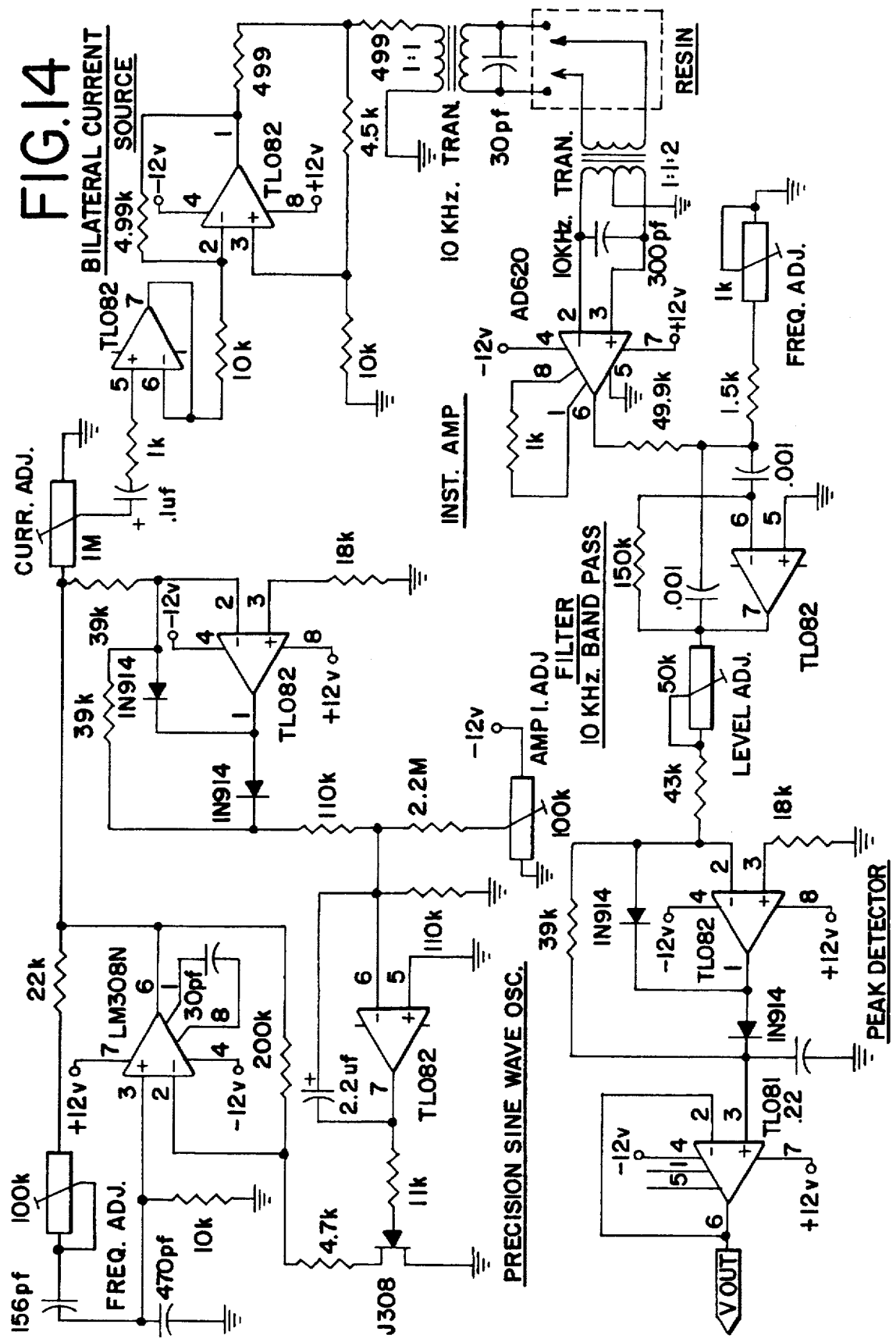
FIG. 14 is a detailed schematic of the block diagram shown in FIG. 13.
Figure 15:
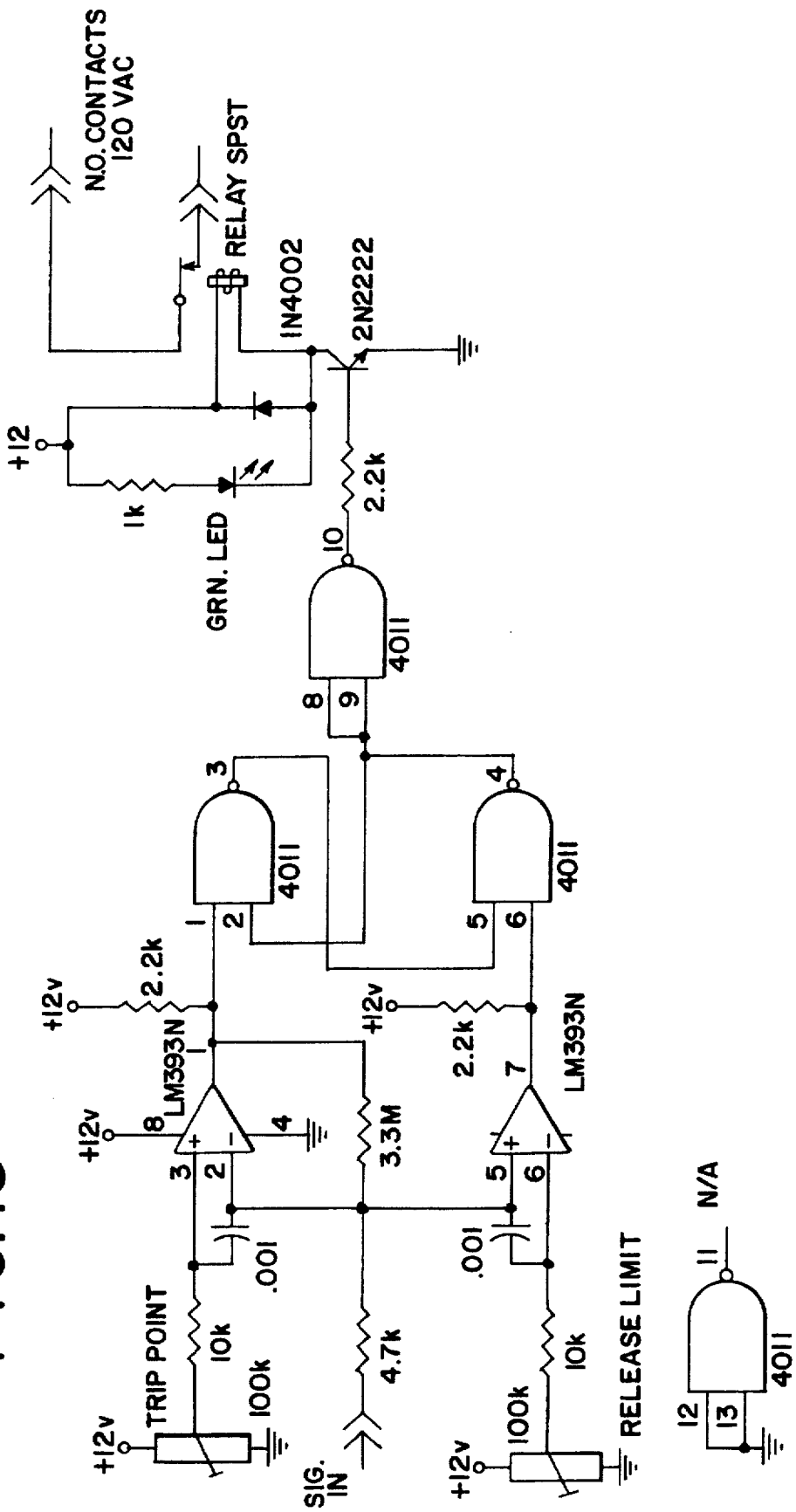
FIG. 15 is a detailed schematic of the relay control shown in the block diagram in FIG. 13.

FIGS. 14 and 15 are a detailed schematics of the electronics block diagramed in FIG. 13. The schematics are provided for completeness only, and those skilled in the art will appreciate that there are many ways to accomplish the block diagram of FIG. 13, and FIGS. 14 and 15 are simply a representation of one of those many ways.

Various features of the invention have been particularly shown and described in connection with the illustrated embodiments of the invention, however, it must be understood that these particular arrangements merely illustrate, and that the invention is to be given its fullest interpretation within the terms of the appended claims.

We claim:

1. A system to sense the state of depletion of an ion exchange media including:

first and second current electrodes spaced from each other;

a fast electrical circuit electrically connecting said rust and second current electrodes and adapted to be connected to a source of alternating current;

a first pair of voltage probes including first and second voltage probes spaced from each other and located approximately between said first and second current electrodes;

a second pair of voltage probes including third and fourth voltage probes spaced from each other and also located approximately between said first and second current electrodes;

means electrically connecting said first and second pairs of voltage probes; and a second electrical circuit consisting of said first and second pairs of voltage probes, said electrical connecting means and the associated portions of the resin bed lying between said first and second voltage probes and between said third and fourth voltage probes, whereby when said first electrical circuit is energized by the source of alternating current, voltages are introduced in said second electrical circuit, said voltages corresponding to the states of the ion exchange media located between said first and second voltage probes and between said third and fourth voltage probes.

2. The system of claim 1, including sensor means connected to said second circuit to sense the voltages induced in said second circuit.

3. The system of claim 2, including amplifying means connected to said sensor means to increase the current of the voltages induced in said second circuit.

4. The system of claim 3, including peak voltage detecting means connected to said amplifying means to determine peak voltages.

5. The system of claim 4, including comparator means connected to said peak voltage detecting means, adapted to receive said peak voltage from said peak voltage means and to compare said peak voltage with a reference voltage value.

6. The system of claim 5, including a third electrical circuit connected between said comparator means and a control valve, adapted to send a regeneration initiating signal to the control valve when said comparator means determines that one of said voltages from said second electrical circuit differs from the reference voltage value by more than a predetermined value.

7. The system of claim 1, including a source of alternating current, said alternating current source operating between the frequencies of about one kilohertz and about one hundred kilohertz.

8. The system of claim 1, wherein said voltage probes are made from an inert material.

9. A method of sensing the state of depletion of an ion exchange media, the steps of the method comprising:

supplying an alternating current at a frequency of between approximately one kilohertz and one hundred kilohertz to first and second current electrodes spaced from each other in an ion exchange media and connected together in a first electrical circuit;

inducing a first voltage in first and second voltage probes spaced from each other in said ion exchange media and located approximately between said first and second current electrodes, said first and second voltage probes being electrically connected in a second electrical circuit, said first induced voltage corresponding to the state of the ion exchange media located between said first and second voltage probes; and inducing a second voltage in third and fourth voltage probes spaced from each other in said ion exchange media and also located approximately between said first and second current electrodes, said third and fourth voltage probes being electrically connected in a third electrical circuit, said second induced voltage corresponding to the state of the ion exchange media located between said third and fourth voltage probes.

10. The method of claim 9 including the step of sensing the voltage in said second circuit.

11. The method of claim 10 including the step of comparing the voltage sensed in said second circuit with a reference voltage.

12. The method of claim 11 including the step of sending a signal to a controller when the voltage in said second circuit deviates from the reference voltage by more than a predetermined amount.

13. The method of claim 12 including the step of regenerating said resin bed upon receipt of said signal.

14. A system of claim 1, wherein said second pair of voltage probes is disposed between said first pair of voltage probes and one of said first and second current electrodes.

* * * * *

UNITED STATES PATENT AND TRADEMARK OFFICE
CERTIFICATE OF CORRECTION

PATENT NO. : 5,680,055
DATED : October 21, 1997
INVENTOR(S) : Seitz et al.

It is certified that error appears in the above-indentified patent and that said Letters Patent is hereby corrected as shown below:

In column 6, line 61, delete "fast" and substitute --first--

Also in column 6, line 61, delete "rust" and substitute --first--.

Signed and Sealed this

Twenty-third Day of December, 1997

Attest:

BRUCE LEHMAN

*Attesting Officer*     *Commissioner of Patents and Trademarks*